(12) United States Patent
Schilling et al.

(10) Patent No.: US 7,789,630 B2
(45) Date of Patent: *Sep. 7, 2010

(54) AIRFOIL AND METHOD FOR PROTECTING AIRFOIL LEADING EDGE

(75) Inventors: Jan Christopher Schilling, Middletown, OH (US); Michael Harvey Schneider, Loveland, OH (US); Robert George Baur, West Chester, OH (US)

(73) Assignee: General Electric Company, Schenectady, NY (US)

( * ) Notice: Subject to any disclaimer, the term of this patent is extended or adjusted under 35 U.S.C. 154(b) by 253 days.

This patent is subject to a terminal disclaimer.

(21) Appl. No.: 11/837,680

(22) Filed: Aug. 13, 2007

(65) Prior Publication Data

US 2009/0053067 A1   Feb. 26, 2009

Related U.S. Application Data

(63) Continuation of application No. 11/781,485, filed on Jul. 23, 2007.

(51) Int. Cl.
 *F01D 5/28* (2006.01)
(52) U.S. Cl. ..................................... 416/224
(58) Field of Classification Search ................. 416/224, 416/241 R
 See application file for complete search history.

(56) References Cited

U.S. PATENT DOCUMENTS

| | | | |
|---|---|---|---|
| 3,637,325 A | 1/1972 | Morley | |
| 4,895,491 A * | 1/1990 | Cross et al. | 416/224 |
| 5,174,024 A | 12/1992 | Sterrett | |
| 5,449,273 A | 9/1995 | Hertel et al. | |
| 5,785,498 A | 7/1998 | Quinn et al. | |
| 7,125,222 B2 | 10/2006 | Cormier et al. | |
| 2008/0085191 A1* | 4/2008 | Liang | 416/241 R |

FOREIGN PATENT DOCUMENTS

| | | |
|---|---|---|
| DE | 4411679 C1 | 12/1994 |
| EP | 1719699 A1 | 11/2006 |
| GB | 2039526 A | 8/1980 |

* cited by examiner

*Primary Examiner*—Richard Edgar
(74) *Attorney, Agent, or Firm*—Adams Intellectual Property Law; Melvin D. Fletcher

(57) ABSTRACT

An airfoil is disclosed having a concave pressure side and a convex suction side defining a chord length, and a leading edge and a trailing edge. A leading edge protective strip is adhered by a bond layer to and protectively covers the leading edge and respective predetermined portions of the pressure side and suction side of the airfoil body from the leading edge downstream towards the trailing edge. The leading edge protective strip includes a multiplicity of inwardly-facing grooves in which the bond layer is embedded. The grooves define adjacent segments of a predetermined size sufficiently small that, if detached from the vane during engine operation, impact with downstream engine components will not cause damage to the downstream engine components.

18 Claims, 5 Drawing Sheets

AIRFOIL AND METHOD FOR PROTECTING AIRFOIL LEADING EDGE

CROSS REFERENCE TO RELATED APPLICATIONS

This application a continuation of application Ser. No. 11/781,485, filed Jul. 23, 2007.

BACKGROUND OF INVENTION

The subject matter disclosed in this application relates generally to airfoils and a method for protecting airfoil leading edges, and more specifically to a metallic leading edge strip for composite material fan blades and stator vanes that includes a structural feature that prevents domestic object damage (DOD) to downstream engine elements should portions of the leading edge strip break away from the blade or vane.

Many modern turbine engine fan blades and stator vanes are constructed of a composite laminate or molded fiber. These include the Joint Strike Fighter (JSF) F136 engine and the well-known CF6-80C2 high bypass engine. Erosion of the vane material within the harsh environment of the engine is prevented by a V-shaped protective metallic strip which is wrapped around the leading edge and covers a substantial percentage of both the suction and pressure sides of the vanes. In prior art constructions, fitting the metallic leading edge strip is difficult, principally because of the difficulty in controlling the thickness uniformity of the adhesive layer that bonds the metallic strip to the vane. The leading edge of modern airfoils is relatively sharp, and the fit up of the metallic strip to the leading edge is not exact.

Experience with composite stator vanes has shown that the thin metal strips bonded to the leading edge of the airfoil for erosion protection may become detached during engine operation. Detachment is typically due to bonding failure caused by strain mismatch between the metal strip and the composite material of the blade or vane during operation at elevated temperatures. Detachment of leading edge strips can cause unacceptable domestic object damage (DOD) to airfoils and other engine components located downstream in the engine flow path.

An important element in controlling bonding integrity is the ability of the bond material to act as a compliant layer between the composite material and the metal strip to absorb the strain mismatch. When detachment occurs, the structure of the current leading edge strips does not permit control of the size of the detached strip fragments, leading to the possibility of downstream ingestion of relatively large, irregularly-shaped metallic material and consequent engine damage.

Therefore, there exists a need to minimize detachment of protective leading edge strips from airfoil leading edges and to reduce damage to downstream engine components in the event of detachment.

BRIEF DESCRIPTION OF THE INVENTION

According to one aspect of the invention, an airfoil is provided that includes an airfoil body including a concave pressure side and a convex suction side defining a chord length, and a leading edge and a trailing edge. A leading edge protective strip is adhered by a bond layer to, and protectively covers, the leading edge and respective predetermined portions of the pressure side and suction side of the airfoil body from the leading edge downstream towards the trailing edge. The leading edge protective strip includes a multiplicity of inwardly-facing grooves into which the bond layer is embedded, and defines adjacent segments of a predetermined size sufficiently small that, if detached from the airfoil during engine operation, impact with downstream engine components does not cause damage to the downstream engine components.

According to another aspect of the invention, a method of protecting the leading edge of an airfoil includes the steps of providing an airfoil body including a concave pressure side and a convex suction side defining a chord length, and a leading edge and a trailing edge, and adhering a leading edge protective strip to and protectively covering the leading edge and respective predetermined portions of the pressure side and suction side of the airfoil body from the leading edge downstream towards the trailing edge. The leading edge protective strip includes a multiplicity of inwardly-facing grooves into which the bond layer is embedded, and defines adjacent segments of a predetermined size sufficiently small that, if detached from the airfoil during engine operation, impact with downstream engine components does not cause damage to the downstream engine components.

BRIEF DESCRIPTION OF DRAWINGS

Some aspects of the invention have been set forth above. Other aspects of the invention will appear as the invention proceeds when taken in conjunction with the following drawings, in which.

DETAILED DESCRIPTION AND BEST MODE OF THE INVENTION

Figure 1:
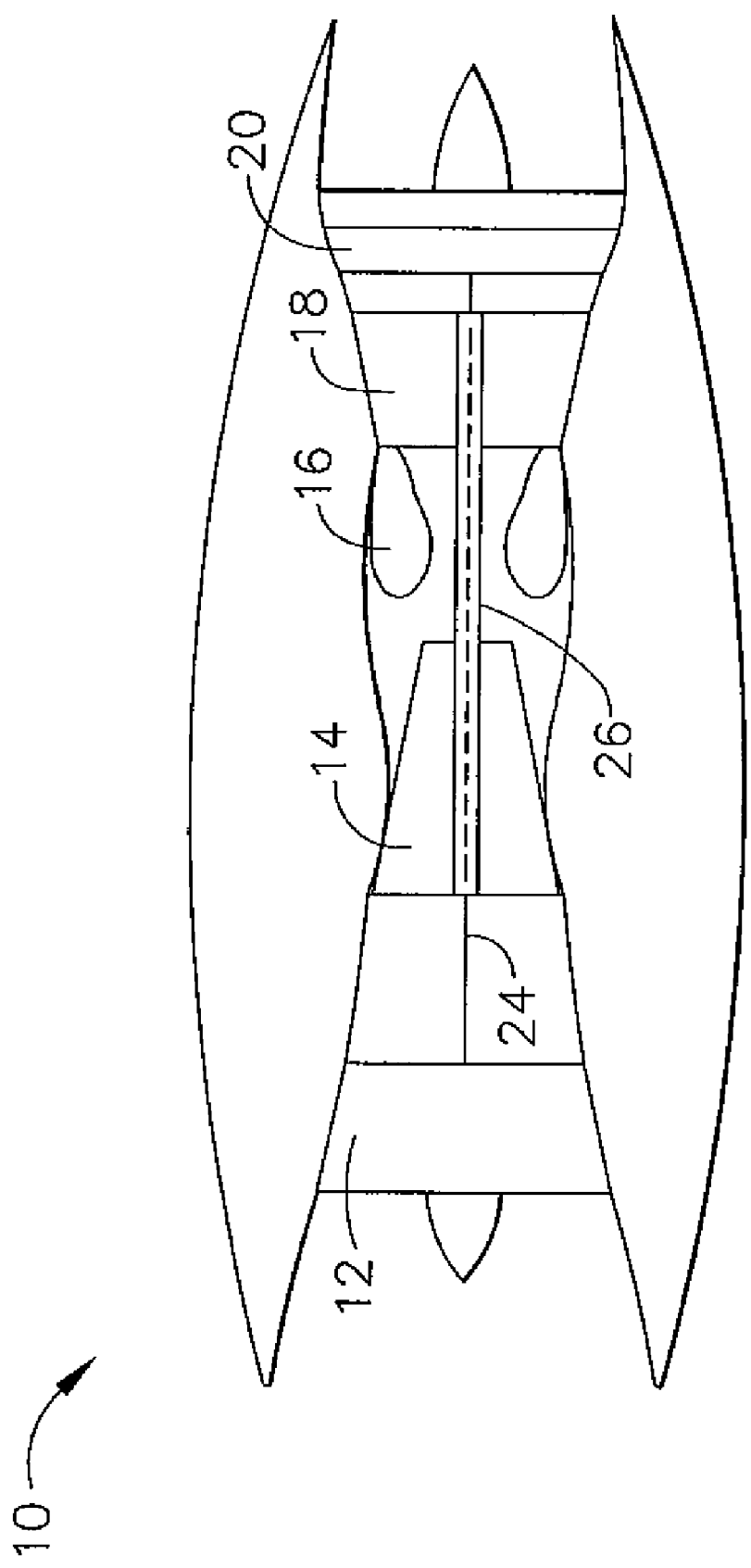
FIG. 1 is a simplified perspective view of a gas turbine engine.

Referring now to FIG. 1, a gas turbine engine 10 is shown schematically, and includes a low pressure compressor 12, a high pressure compressor 14, and a combustor 16. Engine 10 also includes a high pressure turbine 18 and a low pressure turbine 20. Compressor 12 and turbine 20 are coupled by a first shaft 24, and compressor 14 and turbine 18 are coupled by a rotor shaft 26.

In operation, air flows through low pressure compressor 12, is compressed and supplied from the low pressure compressor 12 to high pressure compressor 14. The highly compressed air is delivered downstream to combustor 16 where the air is mixed with fuel and ignited. The ignited air/gas mixture from the combustor 16 drives the turbines 18 and 20.

Figure 2:
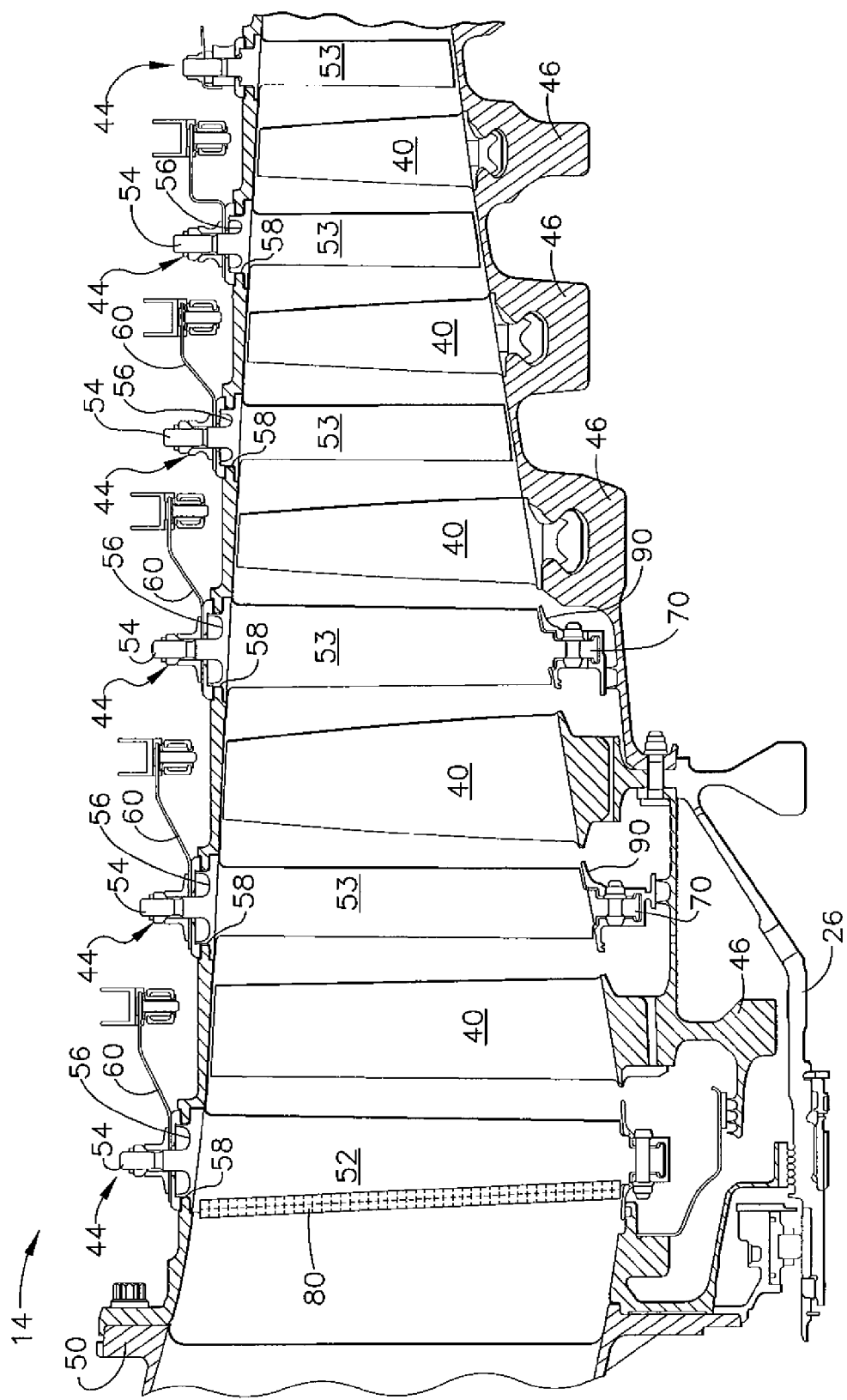
FIG. 2 is a partial schematic side elevation view of an exemplary gas turbine engine high pressure compressor assembly.

As is shown in FIG. 2, the high pressure compressor 14 includes a plurality of stages, and each stage includes an array of radially-extending rotor blades 40 and an array of radially-extending stator vane assemblies 44. In the exemplary embodiment, rotor blades 40 are supported by rotor disks 46 and are coupled to rotor shaft 26. Rotor shaft 26 is surrounded by a casing 50 that extends circumferentially around compressor 14 and supports the stator vane assemblies 44.

In the exemplary embodiment shown in FIG. 2 the inlet guide vane 52 and variable vanes 53 include a radially outer vane stem or spindle 54 that extends substantially perpendicularly from a vane platform 56. Each spindle 54 extends through a respective opening 58 defined in casing 50 to enable a respective vane 52 to be coupled to casing 50. Casing 50 includes a plurality of openings 58. A lever arm 60 extends from each variable vane 52 and is utilized to selectively rotate vanes 52 for changing the orientation of vanes 52 relative to the flowpath to facilitate increased control of airflow through compressor 14. It is understood that the invention disclosed in this application may be used on vanes and blades without regard to whether the vanes or blades have variable pitch. While at present airfoil temperatures in the compressor 14, except for the inlet guide stator vane 52, are typically too hot for vanes made of known composite materials, metallic leading edge protective strips on any one or more vanes, as described below, are considered within the scope of the invention, since further advances may render practical composite material vanes throughout the compressor.

Figure 3:
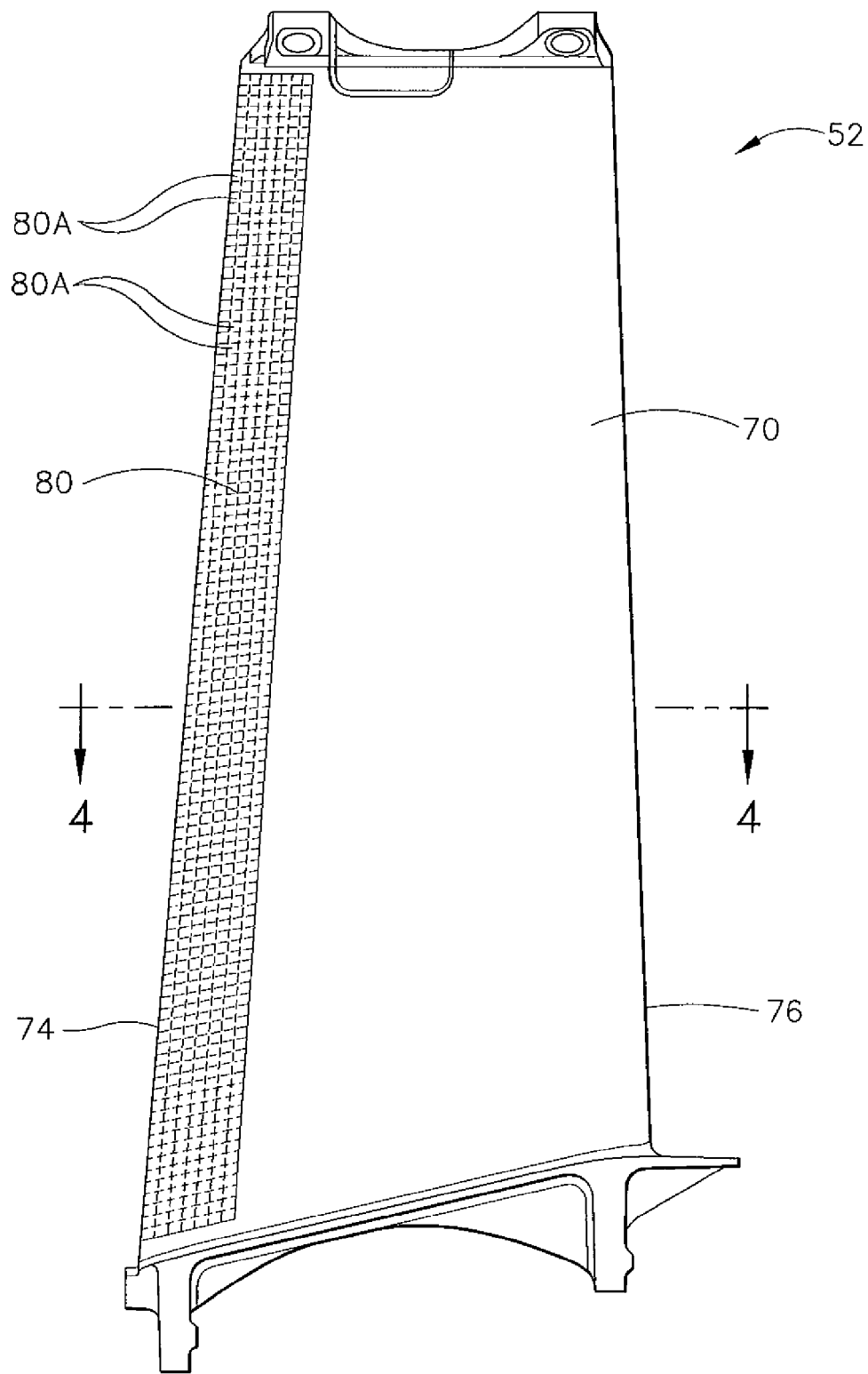
FIG. 3 is a perspective view of a single stator vane.
Figure 4:
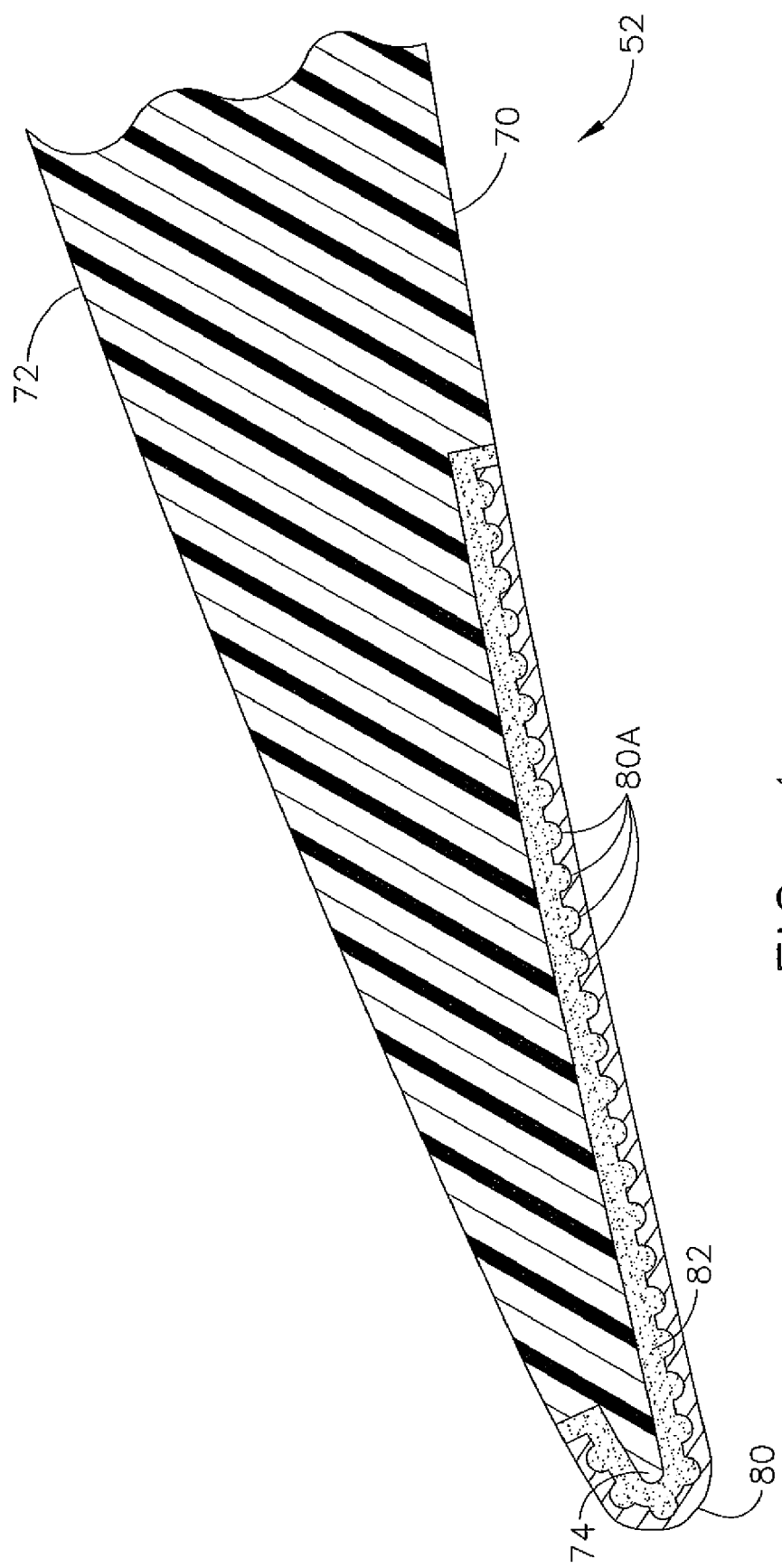
FIG. 4 is a partial cross-section of the vane in FIG. 3, taken along lines 4-4.

As is best shown in FIGS. 3 and 4, the stator vane 52 includes an airfoil body formed of a polymeric composite of known type, and having a concave pressure side 70 and a convex suction side 72, FIG. 4, defining a chord length, a leading edge 74 and a trailing edge 76.

A leading edge protective strip 80 is adhered by a bond layer 82 to, and protectively covers, the leading edge 74 and respective predetermined portions of the pressure side 70 and suction side 72 of the airfoil body from the leading edge 74 downstream towards the trailing edge 76. Erosion of the leading edge 74 is typically more severe on the pressure side 70 of the vane 52 and, accordingly, as shown with particular reference to FIG. 4, the predetermined portion of the suction side 72 covered by the leading edge protective strip 80 is therefore much less than the portion of the pressure side 70 covered by the leading edge protective strip 80. This facilitates a more accurate control of the thickness of the bond layer 82 which in turn leads to superior bond strength.

The vane 52 can be bowed out of plane with respect to a radial line extending through the engine axis. This is done to accommodate the aerodynamic effects at the airfoil inner and outer flowpath. However, this bow can further complicate the fit between the leading edge protective strip 80 and the vane 52, and makes the design described herein, with the leading edge protective strip 80 principally on the pressure side 70, particularly desirable.

The leading edge protective strip 80 is preferably metallic, and is selected to have thermal expansion and comformability characteristics suitable for the polymeric composite from which the vane 52 is formed. Titanium is one suitable metal for this purpose. The leading edge protective strip 80 is preferably less than about 0.25 mm thick, with a thickness in the range of about 0.13 mm to 0.2 mm thick. As is shown schematically in FIG. 4, the length of the leading edge protective strip 80 extending around the leading edge 74 and onto the suction side 72 is about 2.5 mm, or more generally about 2-3 percent of the airfoil chord length. Empirically, the degree of extension of the leading edge protective strip 80 onto the suction side 72 must be sufficient to prevent the edge of the leading edge protective strip 80 from being separated from the vane 52 and lifted by airflow/gas pressure.

The thickness and material of the bond or compliant layer 82 is determined by analysis in order to reduce shear stresses between the leading edge protective strip 80 and the vane 52. The material of the bond layer 82 is preferably bismaleimide ((BMI) or a fluoroelastomer such as manufactured and sold by DuPont under the trademark Viton®, in order to provide stable, long-lasting performance in the 204-260 C. engine environment. Bond thickness is preferably on the order of 0.05 mm to 0.15 mm.

As is representationally shown in FIGS. 3 and 4, the leading edge protective strip 80 is grooved with interior-facing grooves 80A to define small geometrically-shaped segments of a size sufficiently small that, if detached from the airfoil during engine operation, impact with downstream engine components would not cause domestic object damage (DOD) to the downstream engine components. The grooves 80A preferably form segments that have sides between about 2.5 mm and 6.3 mm long. The grooves 80A themselves are on the order of about 0.13 mm wide with a depth that is about one-third the thickness of the leading edge protective strip 80. The grooves 80A may define squares, diamonds, other quadrilateral shapes, or any other suitable shape. The outer surface of the leading edge strip 80 is smooth and is intended to provide an essentially turbulence-free transition from the adjacent vane surface. The inner, grooved surface additionally provides a greater surface area on the inner face of the leading edge strip 80 to thereby provide an enhanced bond between the leading edge strip 80 and the underlying bond layer 82.

Figure 5:
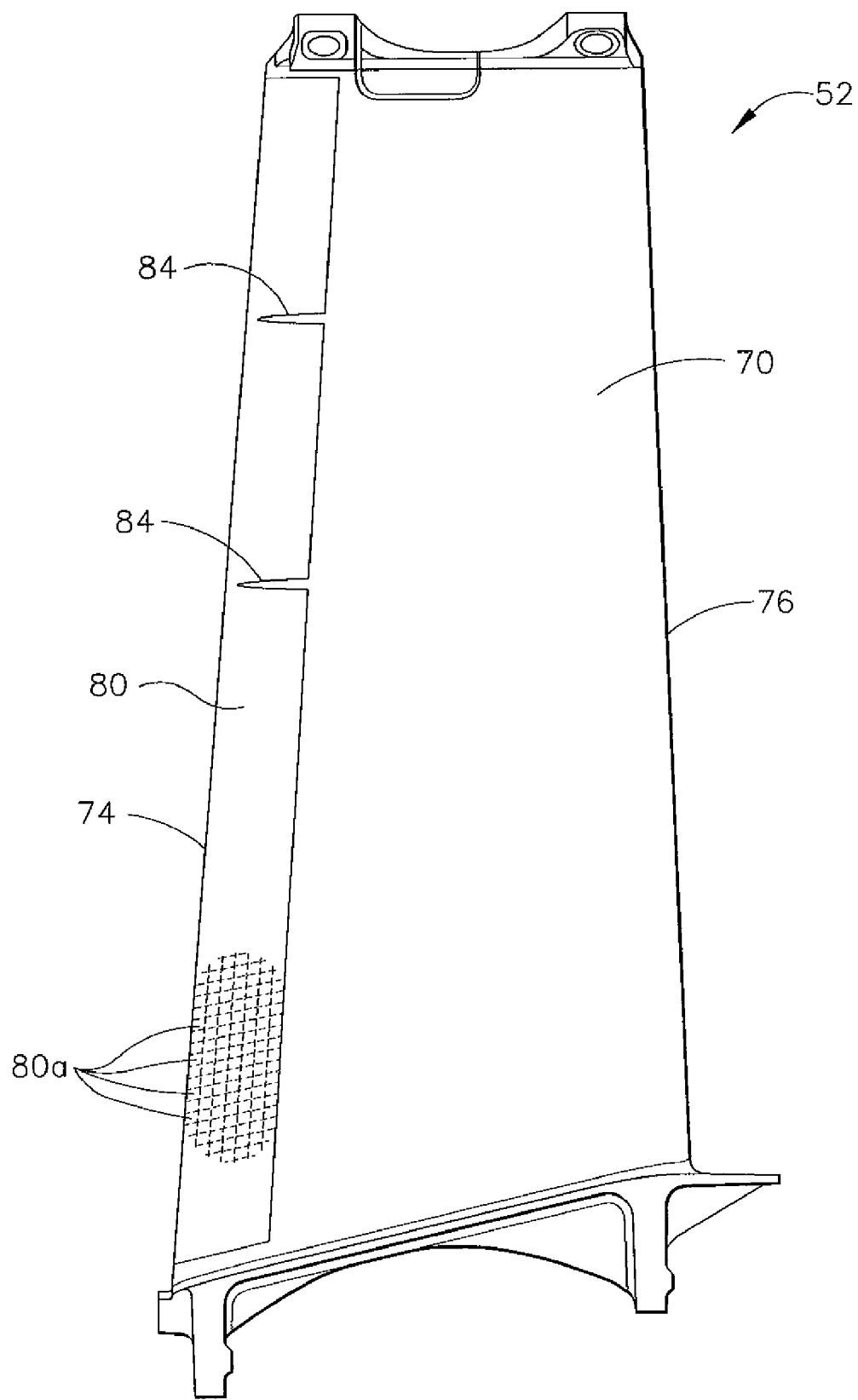
FIG. 5 is a side elevation view of a single stator vane according to an alternative embodiment of the invention.

As is shown in FIG. 5, the leading edge protective strip 80 may optionally be provided with axially-extending adjustment slits 84 radially spaced along the vane 52, by which the leading edge protective strip 80 can be more precisely fitted to the shape of the leading edge 74 of the vane 52. The slits 84 have shallow, inwardly-tapered draft angles that are closed together when applied so that the opposing edges of the slits 84 touch.

An airfoil with a metallic leading edge strip and a method for protecting the leading edge of an airfoil is described above. This written description uses examples to disclose the invention, including the best mode for practicing the invention, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. An airfoil of an engine, comprising:
   an airfoil body including a concave pressure side and a convex suction side defining a chord length, a leading edge and a trailing edge;
   a leading edge protective strip adhered by a bond layer to and protectively covering the leading edge and respective predetermined portions of the pressure side and suction side of the airfoil body from the leading edge downstream towards the trailing edge;
   the leading edge protective strip including a multiplicity of inwardly-facing grooves into which the bond layer is embedded, and defining adjacent segments of a predetermined size sufficiently small to minimize damage to the engine if individual ones of the segments were to become detached from the airfoil during engine operation.

2. An airfoil according to claim 1, wherein the airfoil is selected from the group consisting of a turbine engine fan blade, turbine engine compressor blade and a turbine engine stator vane.

3. An airfoil according to claim 1, wherein the grooves intersect to define discrete geometrical shapes.

4. An airfoil according to claim 3, wherein the grooves are spaced to define segments that have sides between about 2.5 and 6.3 mm long.

5. An airfoil according to claim 1, wherein the predetermined portion of the suction side of the airfoil covered by the leading edge protective strip is a portion extending about 0.25 mm from the leading edge downstream towards the trailing edge.

6. An airfoil according to claim 1, wherein the bond layer is between about 0.05 mm and 0.15 mm thick and the leading edge protective strip is between about 0.13 and 0.2 mm thick.

7. An airfoil according to claim 6, wherein the airfoil is selected from the group consisting of a turbine engine fan blade, turbine engine compressor blade, and a turbine engine stator vane.

8. An airfoil according to claim 1, wherein the predetermined portion of the suction side covered by the leading edge protective strip is between about 1 and 3 percent of the chord length of the airfoil, the predetermined portion of the suction side covered of the airfoil covered by the leading edge protective strip is about 2.5 mm from the leading edge downstream towards the trailing edge, and the leading edge protective strip comprises the multiplicity of inwardly-facing grooves that intersect to define adjacent segments of a predetermined size sufficiently small that, if detached from the airfoil during engine operation, impact with downstream engine components would cause minimal damage to the downstream engine components, wherein the grooves are less than about 0.13 mm wide and are about one-third the thickness of the leading edge protective strip, the bond layer is between about 0.05 mm and 0.15 mm thick, segments that have sides between about 2.5 mm and 6.3 mm long and the leading edge protective strip is between about 0.13 mm and 0.2 mm thick, and wherein the inwardly-facing grooves provide increased surface area for attachment of the leading edge protective strip to the airfoil.

9. A method of protecting the leading edge of an airfoil of an engine, comprising the steps of:
  providing an airfoil body including a concave pressure side and a convex suction side defining a chord length, and a leading edge and a trailing edge;
  forming in a leading edge protective strip a multiplicity of grooves defining adjacent segments of a predetermined size sufficiently small to minimize damage to the engine if individual ones of the segments were to become detached from the airfoil during engine operation; and
  adhering the leading edge protective strip to and protectively covering the leading edge and respective predetermined portions of the pressure side and suction side of the airfoil body from the leading edge downstream towards the trailing edge.

10. A method according to claim 9, wherein the grooves intersect to define discrete geometrical shapes.

11. A method according to claim 10, wherein the grooves are less than about 0.13 mm wide and are about one-third the thickness of the leading edge protective strip.

12. A method according to claim 9, wherein the bond layer is between about 0.05 mm and 0.15 mm thick and the leading edge protective strip is between about 0.13 and 0.2 mm thick.

13. A method according to claim 9, wherein the airfoil is selected from the group consisting of a turbine engine fan blade, a turbine engine compressor blade and a turbine engine stator vane.

14. A turbine engine, comprising a low pressure compressor, a high pressure compressor, a high pressure turbine, a low pressure turbine and a combustor, and a plurality of radially-extending stator vanes, at least one of the stator vanes comprising:
  a vane body including a concave pressure side and a convex suction side defining a chord length, and a leading edge and a trailing edge; and
  a leading edge protective strip adhered by a bond layer to and protectively covering the leading edge and respective predetermined portions of the pressure side and suction side of the vane body from the leading edge downstream towards the trailing edge;
  the leading edge protective strip including a multiplicity of inwardly-facing grooves in which the bond layer is embedded, and defines adjacent segments of a predetermined size sufficiently small to minimize damage to the engine if individual ones of the segments were to become detached from the airfoil during engine operation.

15. A turbine engine according to claim 14, wherein the predetermined portion of the suction side of the vane covered by the leading edge protective strip is between about 1 and 3 percent of the chord length of the airfoil.

16. A turbine engine according to claim 14, wherein the predetermined portion of the suction side of the vane covered by the leading edge protective strip is about 2.5 mm from the leading edge downstream towards the trailing edge.

17. A turbine engine according to claim 14, wherein the leading edge protective strip is provided with a plurality of axially-extending adjustment slits radially spaced along the vane body.

18. A turbine engine according to claim 17, wherein the grooves are less than about 0.13 mm wide and are about one-third the thickness of the leading edge protective strip.

\* \* \* \* \*